US006654365B1

(12) United States Patent
Sylvester et al.

(10) Patent No.: US 6,654,365 B1
(45) Date of Patent: Nov. 25, 2003

(54) REDUCED COMPLEXITY TRELLIS-BASED MULTIUSER DETECTOR FOR CDMA

(75) Inventors: Randal R. Sylvester, West Valley City, UT (US); Thomas R. Giallorenzi, Riverton, UT (US)

(73) Assignee: L-3 Communications Corporation, Salt Lake City, UT (US)

(*) Notice: Subject to any disclaimer, the term of this patent is extended or adjusted under 35 U.S.C. 154(b) by 0 days.

(21) Appl. No.: 09/256,716

(22) Filed: Feb. 24, 1999

Related U.S. Application Data

(60) Provisional application No. 60/075,705, filed on Feb. 24, 1998.

(51) Int. Cl.[7] .................................................. H04J 13/00
(52) U.S. Cl. ........................................ 370/342; 375/147
(58) Field of Search ................................. 370/320, 335, 370/342, 441, 902, 912, 913; 375/130, 135, 136, 146, 147, 265, 341, 152

(56) References Cited

U.S. PATENT DOCUMENTS

| 5,905,742 A | * | 5/1999 | Chennakeshu et al. ..... 371/43.4 |
| 6,345,073 B1 | * | 2/2002 | Curry et al. ................. 375/265 |

OTHER PUBLICATIONS

U. Fawer and B. Aazhang. Multiuser Receivers for Code–Division Multiple–Access Systems with Trellis–Based Modulation. IEEE Journal on Selected Areas in Communications, vol. 14, No. 8, Oct. 1996. pp. 1602–1609.*
U. Fawer and B. Aazhang. Multiuser Reception for Trellis–Based Code Division Multiple Access Communications. 1994 IEEE. pp. 977–981.*
M. Nasiri–Kenari, R. Sylvester, and C. Rushforth. An Efficient Soft –In–Soft–Out Multiuser Detector for Synchronous CDMA with Error–Control Coding. IEEE Transactions on Vehicular Technology, vol. 47, No. 3, Aug. 1998. pp. 947–953.*
Minimum Probability of Error for Asynchronous Gaussian Multiple–Access Channels, by Sergio Verdú, IEEE Transactions on Information Theory, vol. IT–32, No. 1, Jan. 1986, pp. 85–96.
Joint Signal Detection and Parameter Estimation in Multiuser Communications, by Zhenhua Xie, Craig K. Rushforth, Robert T. Short, and Todd K. Moon, IEEE Transactions on Communications, vol. 41, No. 7, August 1993, pp. 1208–1216.

(List continued on next page.)

*Primary Examiner*—Melvin Marcelo
(74) *Attorney, Agent, or Firm*—Perman & Green, LLP

(57) ABSTRACT

A maximum likelihood (ML) detector provides improved performance in the presence of multiple user interference (MUI), particularly performance of a multiuser receiver for asynchronous CDMA. The detector can be implemented using a Viterbi algorithm, this greatly reducing system sensitivity to MUI. An approximation to the ML detector provides a sparse trellis search based on the structure of the ML detector. The resulting detector, which may be referred to as a reduced-complexity recursive detector (RCRD), has a dynamic structure that allows a trade-off between complexity and performance. Use is made of a unique metric to define the trellis-structure and the M-algorithm to reduce the number of surviving paths. The metric calculation is then repeated at decision points to provide soft-decision information for further signal processing, soft-decision decoding of an error-correction code, or iterative reception of the multiuser signal.

5 Claims, 8 Drawing Sheets

OTHER PUBLICATIONS

On Channel Coding and Multiuser Detection for DS–CDMA, by Peter Hoeher, Institute for Communications Technology, German Aerospace Research Establishment (DLR), pp. 1–12.

An Efficient Soft–Decision Decoding Algorithm for Synchronous CDMA Communications woth Error–Control Coding, by M. Nasiri–Kenari, C.K. Rushforth, Department of Electrical Engineering, University of Utah, 1 page.

An Efficient Sof–In–Soft–Out Multiuser Detector for Synchronous CDMA with Error–Control Coding by Masoumeh Nasiri–Kenari, Randal R. Sylvester, and Craig K. Rushforth, IEEE Transactions on Vehicular Technology, vol. 47, No. 3, Aug. 1998, pp. 947–953.

* cited by examiner

REDUCED COMPLEXITY TRELLIS-BASED MULTIUSER DETECTOR FOR CDMA

CROSS REFERENCE TO A RELATED APPLICATION

Priority is herewith claimed under 35 U.S. C. §119 (e) from Provision Patent Application No. 60/075,705, filed Feb. 24, 1998, entitled "REDUCED COMPLEXITY MULTIUSER DETECTION USING TRELLIS-SEARCH ALGOITHMS FOR CDMA SYSTEMS", by Randal R. Sylvester. The disclosure of the Provisional Patent Application is incorporated by reference herein in its entirety.

BACKGROUND OF THE INVENTION

This invention relates to a maximum-likelihood (ML) multiuser detector for direct-sequence code division multiple access (CDMA) and, more particularly, to a reduced-complexity multiuser detector based on the trellis structure of the ML detector.

There is an ever increasing demand or communication of different types of information, such as voice, data and video. In telecommunications systems, use may be made of frequency division multiple access (FDMA), time division multiple access (TDMA), and code division multiple access (CDMA). CDMA has a number of advantages over the other forms of communication, these advantages having led to the IS-95 standard for direct-sequence CDMA (DS-CDMA) for mobile communications, and a similar standard for personal communication systems (PCS). In uplink transmission (mobile users to base stations) of a system based on the IS-95 standard, the users transmit asynchronously with resulting interference between users.

In many CDMA applications, the performance of the communication system is limited by the interference from other users of the communication system. This situation is made worse if one or more of the interfering user signals reaches a receiver with higher power than the power received from a desired user. This results in what is commonly referred to as the near-far problem, and causes unacceptably high bit-error rates if nothing is done to reduce the resulting interference. Therefore, in an interference-limited system, it is important to reduce the multiple user interference (MUI) There are circumstances in which the MUI has a known structure which can be exploited to develop multiuser detectors that improve the performance of both synchronous and asynchronous CDMA channels. However, a problem arises in that existing solutions for reduction of multiple user interference do not produce a desired level of performance.

SUMMARY OF THE INVENTION

The aforementioned problem is overcome and other advantages are provided by the ML detector providing improved performance in the presence of MUI. In accordance with the invention, the ML detector can be implemented using the Viterbi algorithm, this greatly reducing system sensitivity to MUI. This is accomplished in accordance with the invention, by using an approximation to be ML detector which does a sparse trellis search based on the structure of the ML detector. The resulting detector, which may be referred to as a reduced-complexity recursive detector (RCRD), has a dynamic structure that allows a trade-off between complexity and performance. The trellis structure of the RCRD is similar to the trellis structure found in other communication subsystems such as trellis codes, equalizers for the removal of inter-symbol interference, and the modulation of digitally phase modulated signals. The RCRD may be integrated with a decoder for the error-control code (ECC) in a coded CDMA system.

The invention provides a flexible trellis-based method for improving the performance of a multiuser receiver for asynchronous CDMA. The procedure consists of using a unique metric to define the trellis-structure and a unique algorithm to reduce the number of surviving paths. The metric calculation is then repeated at decision points to provide soft-decision information for further signal processing, soft-decision decoding of an error-correction code, or iterative reception of the multiuser signal. The invention provides a variable-complexity model for providing reliable multiple point-to-point communications in an asynchronous CDMA system. The invention allows the user to trade complexity for performance and demodulate a large number of user communications.

DETAILED DESCRIPTION OF THE INVENTION

The description of the methodology of the invention begins with a generalized derivation of the RCRD for use in an asynchronous CDMA channel. The RCRD of the invention employs breadth-first trellis-search algorithms based on the structure of the ML detector. It is noted that the standard M-algorithm detector exhibits a disadvantage in that the detector does not always exhibit monotonic performance improvement as the number of retained communication paths M increases. Accordingly, the invention employs a more general algorithm, which is referred to as the SA (X,Y,Z) algorithm, which algorithm overcomes this disadvantage. The invention provides for specification of the complexity parameters for asynchronous detectors. Success of the invention has been demonstrated by comparison of the near-far resistance and probability of bit-error (PBE) performance of asynchronous CDMA detectors using simulation results.

In particular, there is disclosed a comparison of the implementation complexity of various detectors for asynchronous CDMA. Recent research has suggested that asynchronous approximations to the whitening filter, decorrelator filter or other linear preprocessing filters provide a good performance/complexity trade-off in terms of the number of communication paths that need to be processed in a trellis-search algorithm. When the complexity of the preprocessing filter is included in the complexity comparison, the RCRD of the invention is advantageous over these other forms of detection.

There is improvement in the PBE achieved by adding an error-correction code (ECC) to different CDMA system configurations. Statistically, for the particular examples to be considered, the user errors at the output of the multiuser detector are approximately independent. Thus, interleaving between the multiuser detector and the decoder for the ECC is not required. The invention provides an asynchronous CDMA version of the RCRD that is capable of providing soft-decision information to the decoder for the ECC. These matters are discussed more fully in the ensuing description provided in the section entitled Maximum Likelihood Detector.

Figure 4:
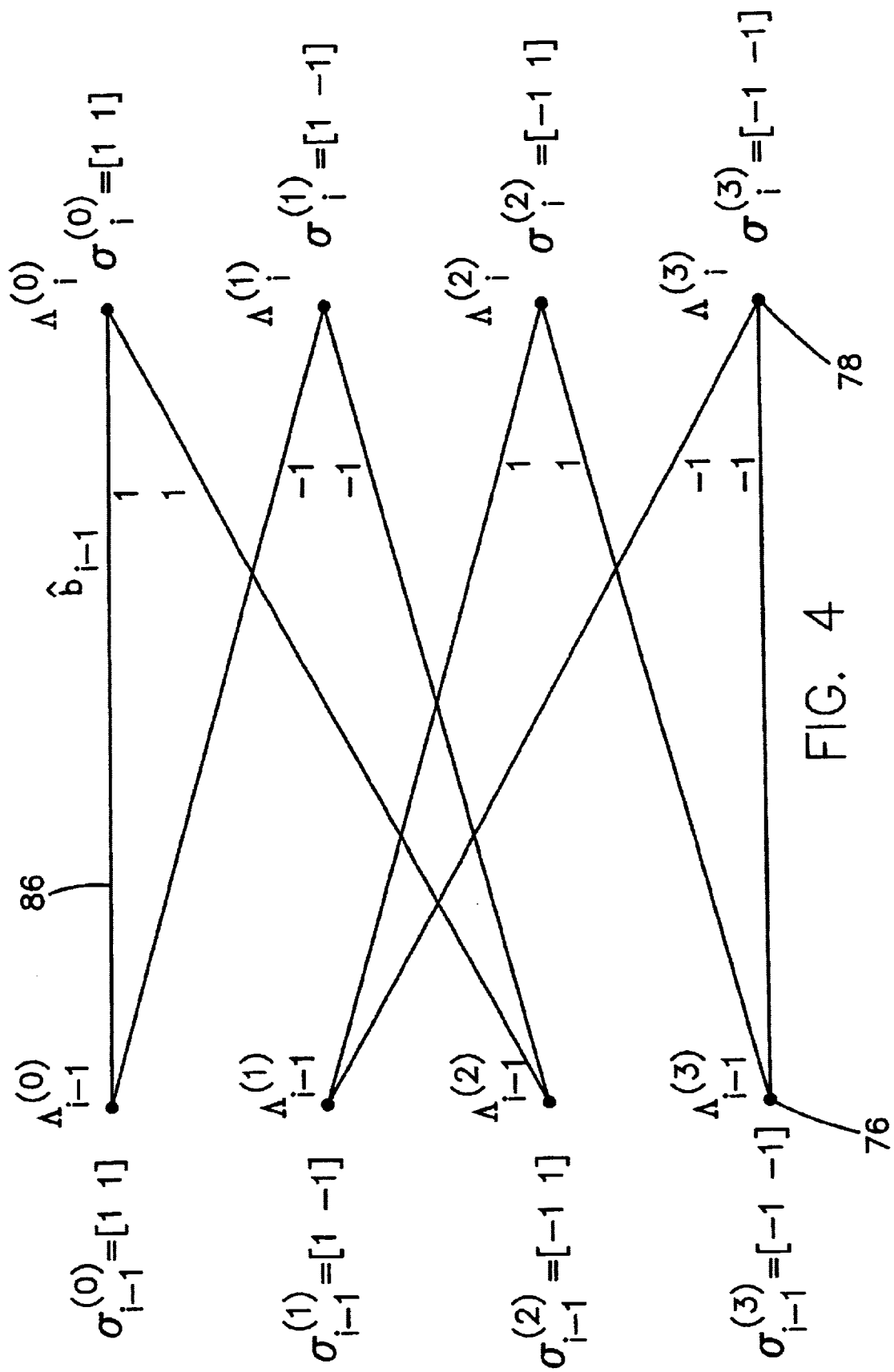
FIG. 4 shows a basic trellis structure for a 3-user BPS K asynchronous CDMA system.
Figure 6:
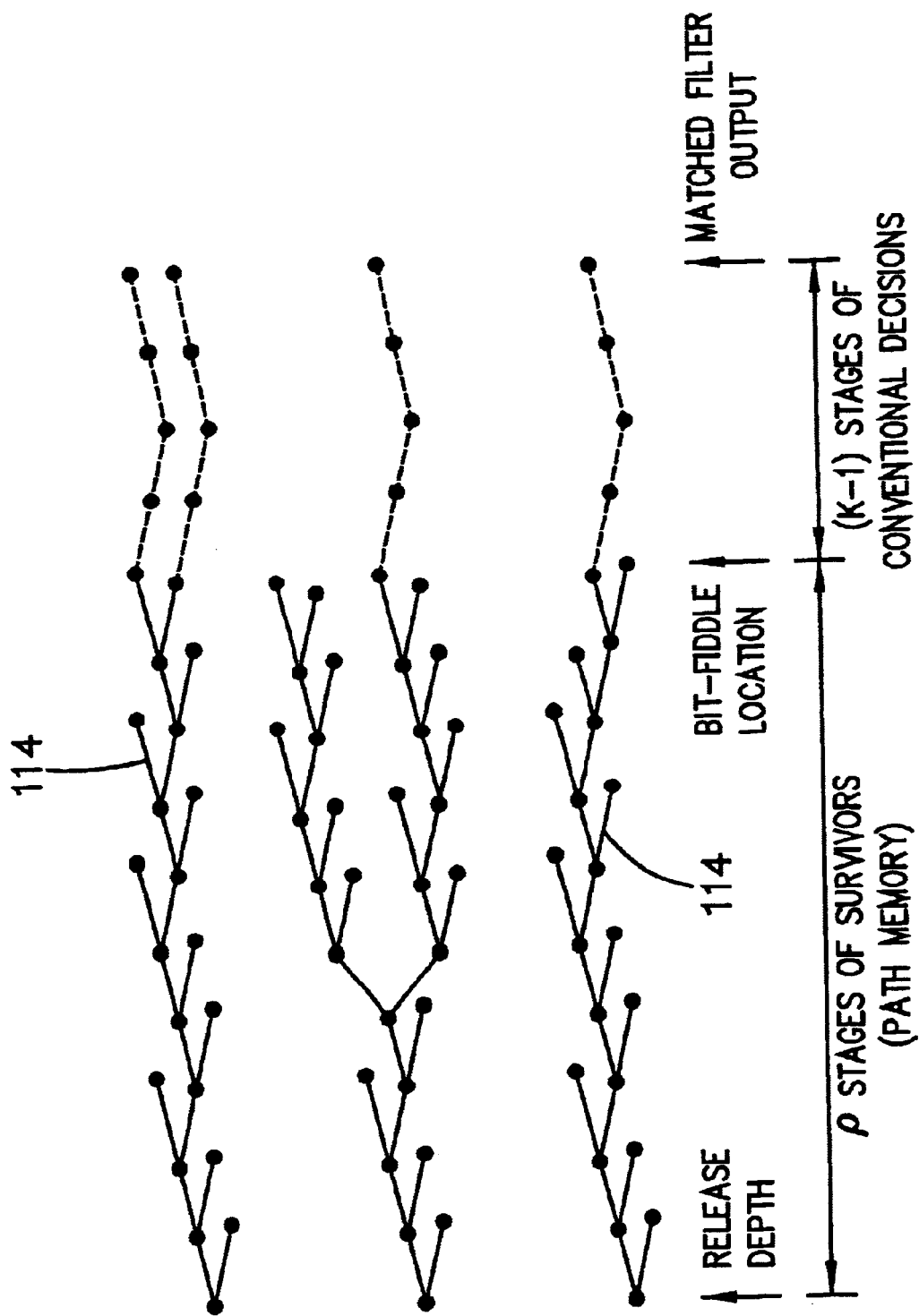
FIG. 6 shows a trellis search structure for a 5-user BPS a system.

In accordance with a feature of the invention, there is a method of multiuser detection of signals transmitted via an asynchronous CDMA by use of a filter having bit-matched outputs. The basic steps of the method precede in the following fashion. The method is operative with a set of bit-matched filter outputs obtained in a receiver of the communication channel wherein the signals of respective ones of the users, there being K users, are presented as the setup bit-matched filter outputs for use in the process of the invention. A trellis representation of metrics (as shown in FIGS. 4 and 6) is developed, based on the set of the bit-matched filter outputs. By use of the trellis representation, there is obtained an approximation to the maximum likelihood estimate of signals coded in a bit stream of the communication. The approximation to the maximum likelihood estimate is obtained via a search routine employing a fractional-search algorithm. This provides a fraction of the possible paths in the trellis representation of the received sequence of data bits. The maximum likelihood estimate can be accomplished by use of a Viterbi algorithm discussed in the section entitled Maximum Likelihood Detector.

In the performing of the trellis computations by use of the algorithm, the algorithm is a breadth-first sparse trellis-search algorithm having a specific structure defined by the following conditions, which conditions are explained more fully in the appendix. These conditions (see particularly the description of the breadth-first search algorithm in the section entitled Maximum Likelihood Detector) provide for $2^{K-1}$ states partitioned into Y sublists; the attainment of the X surviving trellis paths from the previous stage of a succession of trellis computations and extension of the surviving paths to 2X paths; assignment of the 2X paths to the Y sublists according to state; and comparison of the best paths from each of the Y sublists of which the best X paths are the survivors for a succeeding stage of the trellis search.

In accordance with a further aspect of the invention, there is a step of obtaining an approximation to the maximum likelihood estimate via searching of the trellis, by use of the search algorithm, to explore possible paths traversed according to possible received sequences of data bits. In this case, the algorithm is a recursive breadth-first trellis-search algorithm see text following Equations 4.14 and 4.15 in the section entitled Maximum Likelihood Detector) which is processed via the generating of a starting vector using the signs of the first K bit-matched filter outputs. Thereupon, there is an introduction of a recursion process after receipt of the first K signals of the respective matched filter outputs. In the recursion process, there is a production of a modified bit vector which is obtained via inversion of the first bit of the starting vector. This is explained in further detail in the appendix. Conventional decisions are made, this being followed by an appending of the conventional decisions to each of the vectors in the pair of vectors consisting of the starting vector and the modified starting vector. The recursion process continues by inversion of subsequent bits of each of the pair of vectors resulting in another modified pair of vectors. Thereupon, decisions are made based upon the modified pair of vectors, this being followed by the appending of the conventional decisions to each of. the retained vectors.

By way of further features, there is a sorting of hypothesis vectors according to likelihood value, and outputting bits, as a function of decision delay, of the hypothesis vector having the largest metric as the decision see particularly the text following Equations 4.14 and 4.15 in the section entitled Maximum Likelihood Detector). Also, there is the obtaining of reliability information based on a set of Gaussian random variables, a matrix H. of user waveform cross-correlations, and decision delay. (This is explained more fully in the section entitled Maximum Likelihood Detector with reference to equations 2.26 and 4.23.)

In accordance with yet another aspect of the invention, there is an obtaining of an approximation of the maximum likelihood estimate of signals coded in the bit stream, by use of a search algorithm, by a searching of possible paths of the trellis representation. Herein, the algorithm is operative with a succession of stages of trellis processing and, in the case of a binary phase shift keying (BPSK) communication channel, there is a succession of steps which includes the following steps (set forth more fully in the discussion of depth verses breadth in the trellis search in the section entitled Maximum Likelihood Detector). There is a growing of the trellis to $2^{N+M}$ branches from $2^{N+M-1}$ surviving descendants from a previous stage of the trellis computations, where M is the number of parent nodes retained and serves as a breadth parameter, and N is the number of stages of maturity and serves as a depth parameter. Additionally, there is an assigning to each of the 2M parent nodes the best metric of its $2^N$ descendants. There is an outputting of the bit corresponding to the path traversed by the best parent node in a designated number of stages in the past. Furthermore, there is an observing if any parent nodes have merged in state, followed by an eliminating of the one of the parent nodes with the worst metric. Thereupon, there is an employing of the $2^{N+M-1}$ descendants of the M parent nodes with the best metric as the survivors for a next stage of trellis computation.

Figure 1:
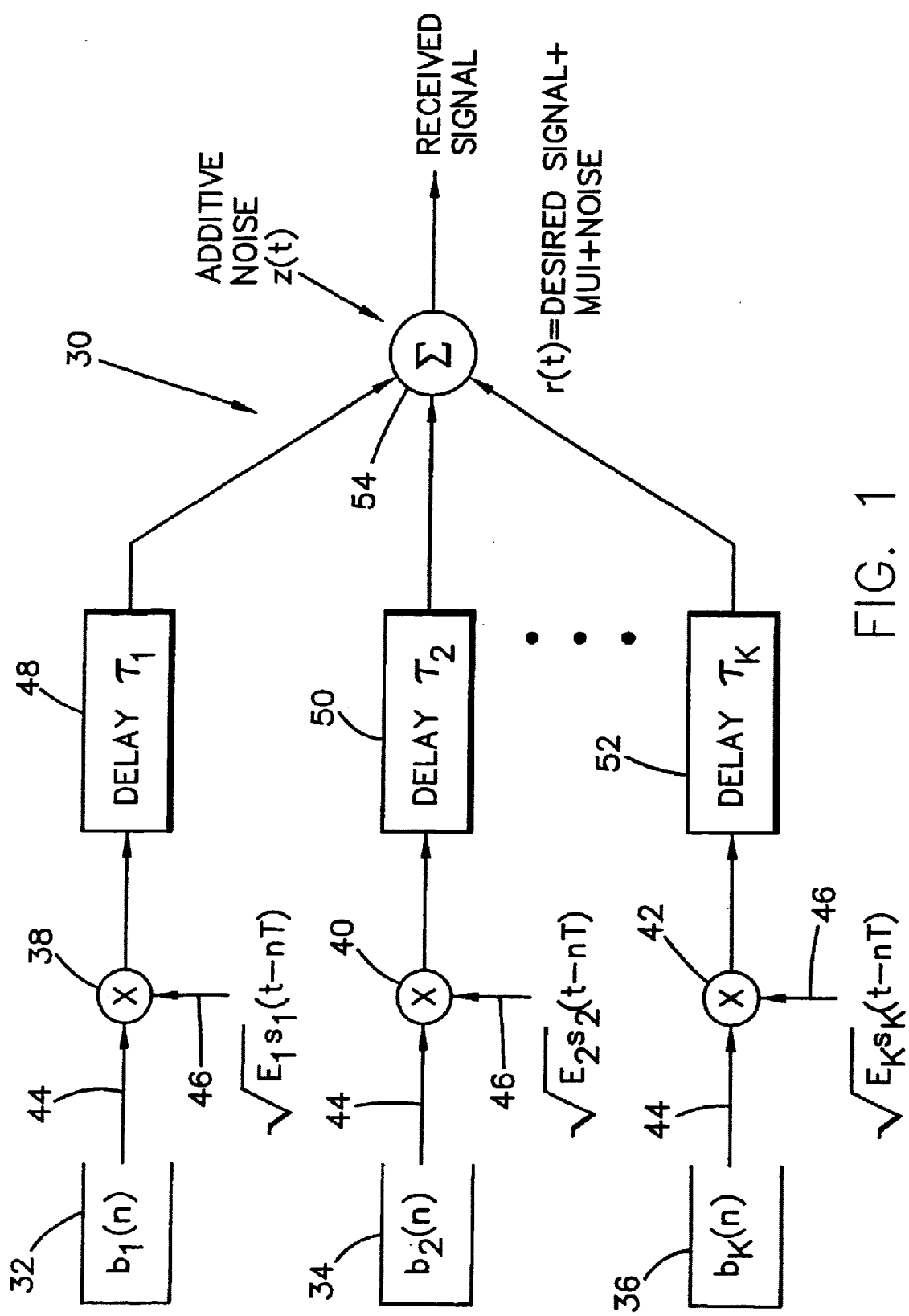
FIG. 1 is a functional block diagram of a CDMA system.
Figure 2:
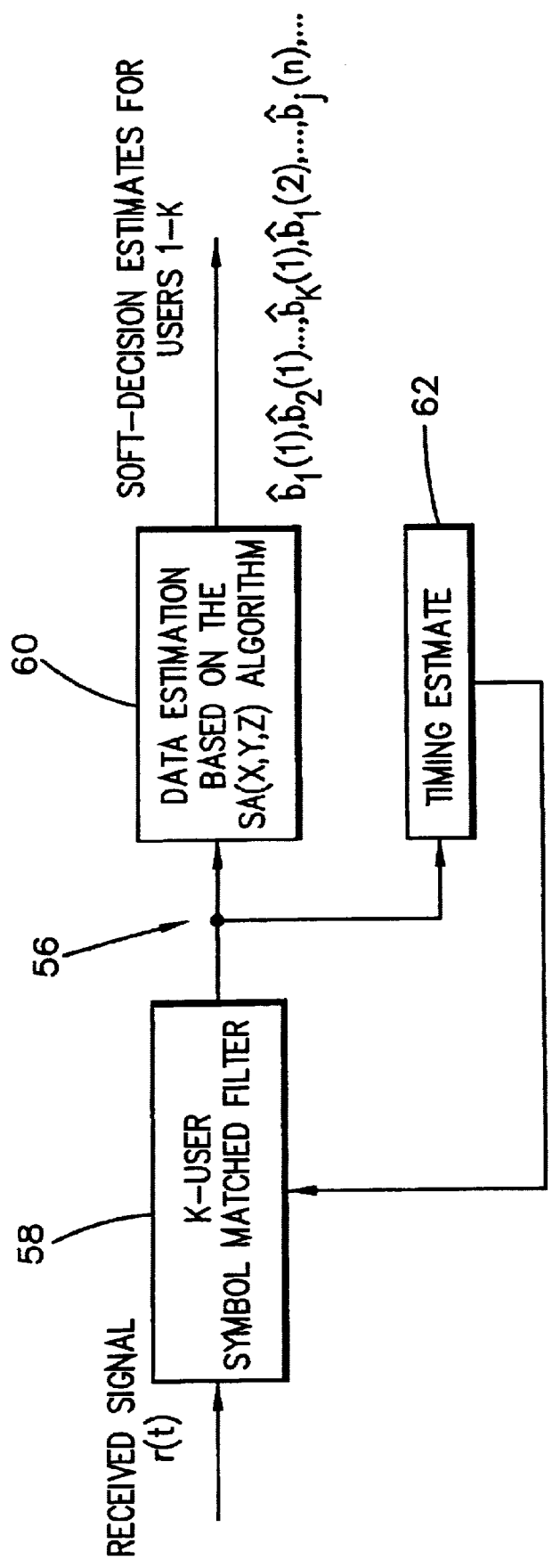
FIG. 2 is a block diagram of a device for recovering transmitted bits.

FIGS. 1–6 provide further detail in the practice of the methodology of the present invention. FIG. 1 shows a CDMA system operating in an additive noise environment, while FIG. 2 shows a block diagram of a device used at a receiver of the CDMA system to recover transmitted bits after a user-defined number of symbols of decoding delay. FIG. 2 presents the structure of a receiver employed to demodulate K simultaneous asynchronous user transmissions by use of the methodology of the invention. With respect to the flow chart of FIG. 3, it is noted that the RCRD algorithm employed in the present method uses the SA(M, $2^{K-1}$,1). FIG. 6 provides an example of the RCRD algorithm for BPSK modulation with five asynchronous users and M=4 paths retained as to each data estimation stage.

FIGS. 1–6 provide further detail in the practice of the methodology of the present invention. FIG. 1 shows a CDMA system operating in an additive noise environment, while FIG. 2 shows a block diagram of a device used at a receiver of the CDMA system to recover transmitted bits after a user-defined number of symbols of decoding delay. FIG. 2 presents the structure of a receiver employed to demodulate K simultaneous asynchronous user transmissions by use of the methodology of the invention. With respect to the flow chart of FIG. 3, it is noted that the RCRD algorithm employed in the present method uses the SA(M, $2^{K-1}$,1). FIG. 6 provides an example of the RCRD algorithm for BPSK modulation with five asynchronous users and M=4 paths retained as to each data estimation stage.

FIG. 1 shows a functional block diagram of a CDMA system operating in an additive noise environment. In this system, there are K users transmitting in an asynchronous manner each using a unique spreading sequence. The data bit transmitted by the $j^{th}$ user during the $n^{th}$ time interval is denoted $b_j$ (n). The amplitude of the $j^{th}$ signal is represented as $\sqrt{E_j}$ and the spreading sequence used during the $n^{th}$ symbol time is denoted $s_j(t-nT)$, where T is the duration of a transmitted symbol. The channel delay of the $j^{th}$ user is represented as a path delay of $\tau_j$. It is assumed without lost of generality that $\tau_K \geq \tau_{F-1} \geq \ldots \tau_1$.

Figure 3:
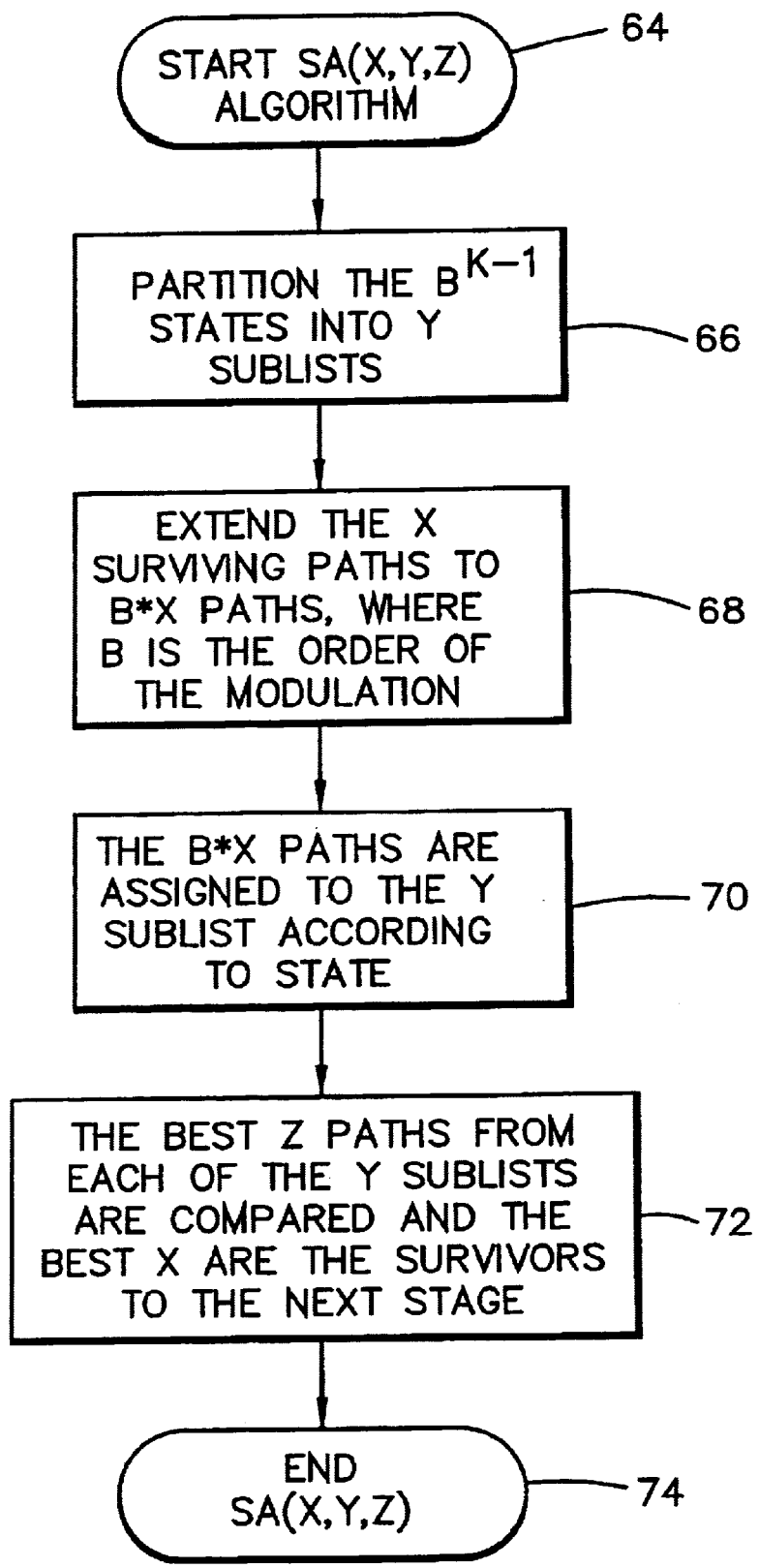
FIG. 3 is a flow chart of a breadth-first trellis search algorithm.

FIG. 3 provides a flowchart representing the SA (X,Y,Z) trellis search algorithm. Important subsets of the SA (X,Y,Z) algorithm include

| | |
|---|---|
| SAN(B) | $\Rightarrow X = B, Y = 2^N, Z = 1$ |
| SA(B, C) | $\Rightarrow X = BC, Y = C, Z = B$ |
| Viterbi | $\Rightarrow X = 2^{K-1}, Y = 2^{K-1}, Z = 1$ |
| M | $\Rightarrow X = M, Y = 1, Z = M$ |
| Pruned M | $\Rightarrow X = M, Y = 2^{K-1}, Z = 1$ |

FIG. 4 shows the basic trellis structure for a 3-user BPSK asynchronous CDMA system. The RCRD technique for data recovery is a suboptimal, but low-complexity trellis search algorithm that exploits this structure.

Figure 5A:
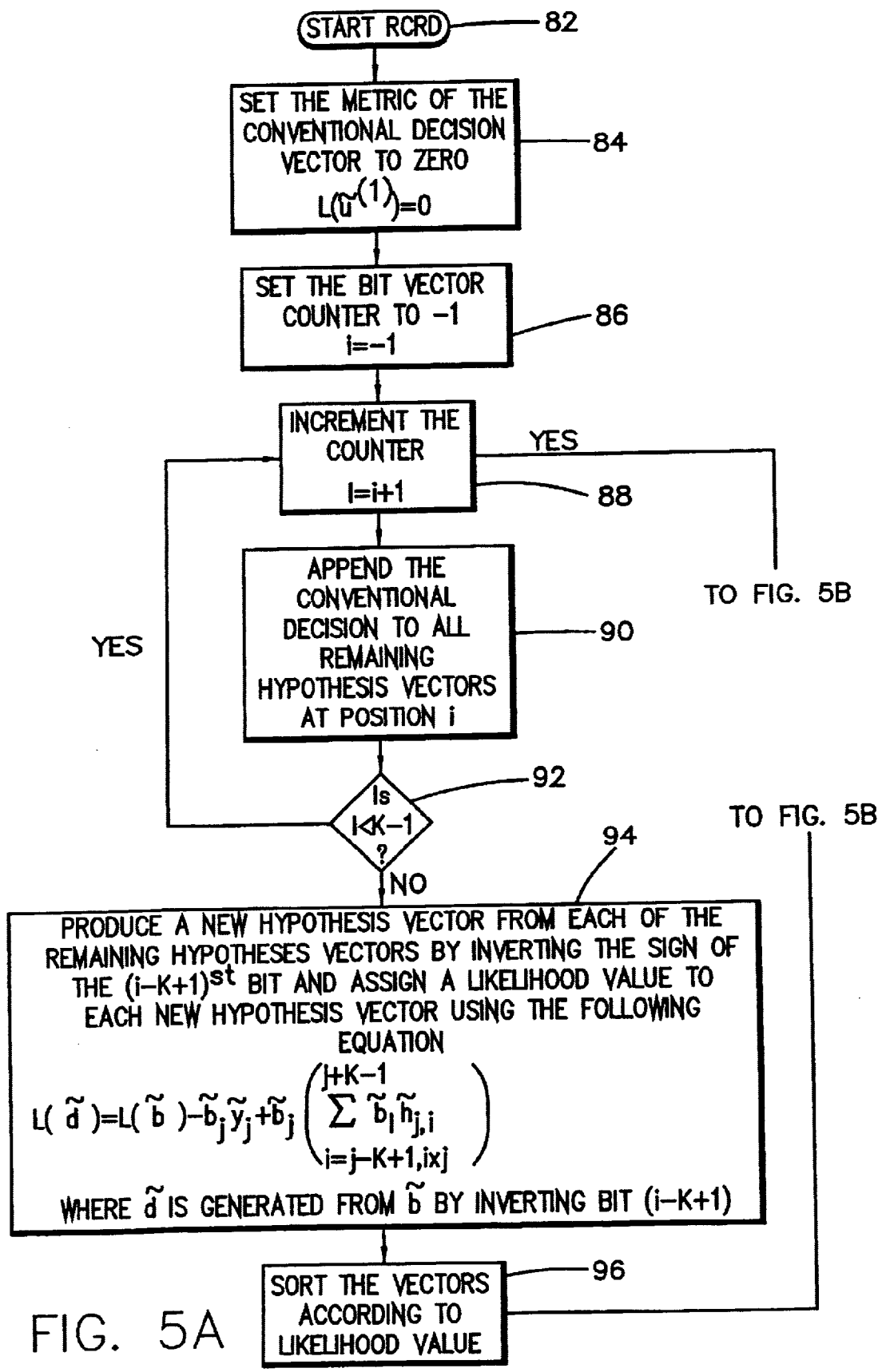
FIG. 5, comprising FIGS. 5A and 5B, detailed flow chart of the RCRD algorithm employed in the method of data recovery.
Figure 5B:
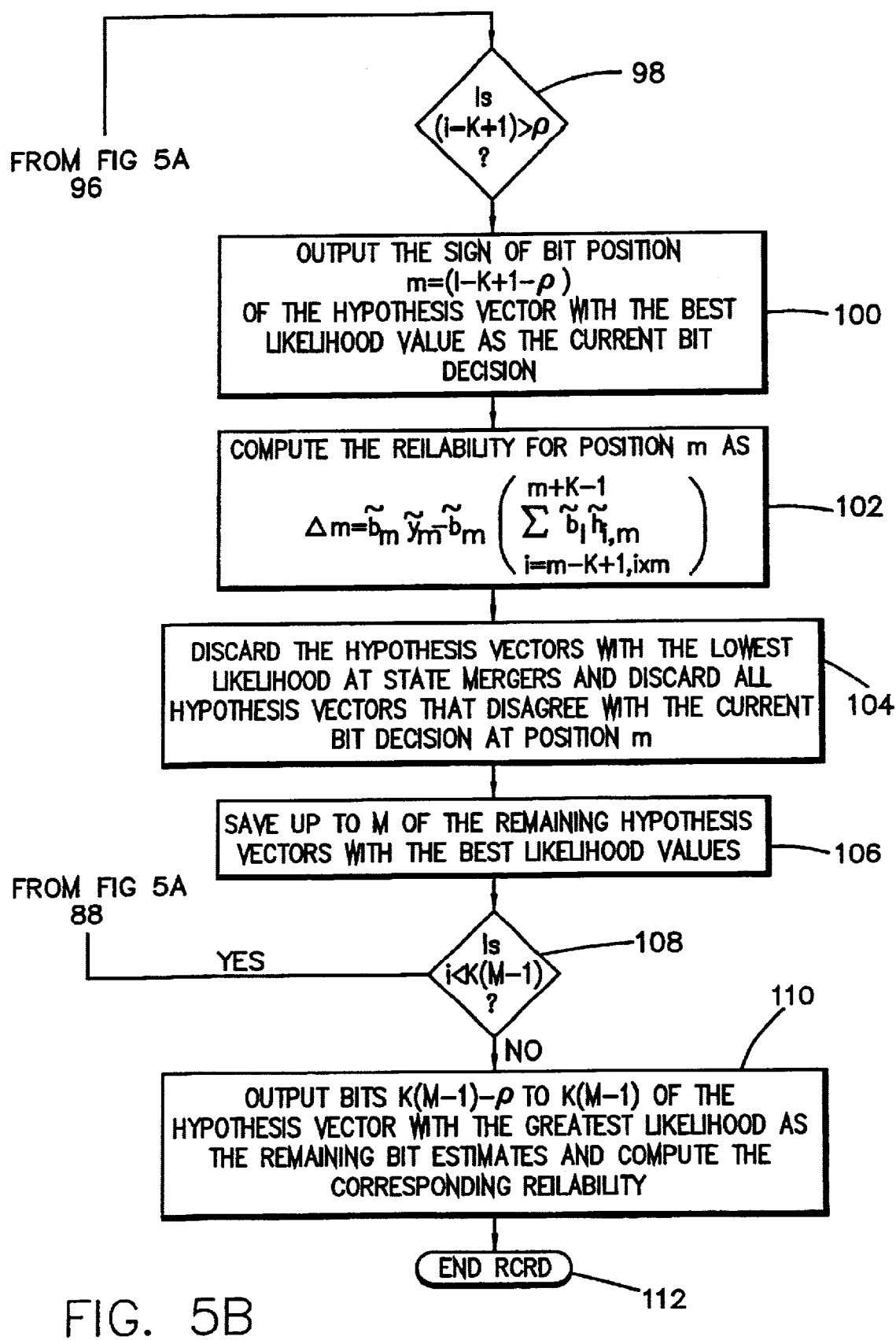

FIG. 5 shows a detailed flowchart of the RCRD method of data recovery. The algorithm could be implemented in software or hardware to perform the required operations to provide an estimate of the transmitted data. Programmable parameters allow the user to trade the system complexity against the data accuracy. The trellis-search structure is shown in FIG. 6 for a BPSK system with 5 users and the number of paths retained set to M=4.

With reference to FIG. 1, the CDMA system 30 is represented in mathematical form wherein, of the numerous K users, three users 32, 34 and 36 are indicated by way of example at the left side of the figure. The respective unique spreading sequences are obtained by use of multipliers 38, 40 and 42 wherein signals of respective one of the users 32, 34 and 36 are multiplied by respective ones of a set of spreading sequences. At each of the multipliers 38, 40 and 42, the user signal is input at port 44 and the spreading sequence is input at port 46. Output products of the multipliers 38, 40 and 42 are applied respectively via delay units 48, 50 and 52 to a summer 54. Each of the delay units 48, 50 and 52 introduces a specific amount of delay to the corresponding product, and the delayed products are then summed at the summer 54 to output the signal received at the CDMA system 30.

In FIG. 2, a device 56 forming a part of a receiver of the CDMA system 30 includes a user symbol matched filter 58, a data estimator 60, and a time estimator 62. The receiver is operative to demodulate simultaneous asynchronous user transmissions. The device 56 serves to recover transmitted bits after a user-defined number of symbols of decoding delay. In the operation of the device 56, the matched filter 58 outputs signals to both the data estimator 60 and the time estimator 62. The output of the time estimator 62 is fed back to the matched filter 58 to be used by the filter 58 in processing the signal received by the system 30.

With respect to the flow chart of FIG. 3, the RCRD algorithm employed in the present method is implemented by a set of steps enclosed in blocks 64–74. The flow chart represents a trellis search algorithm. The algorithm begins at block 64 and moves to block 66 wherein there is a partitioning of states into a number of subsets. Then, at block 68, surviving paths are extended, the extension being based on the order of the modulation. The extended paths are then assigned, at block 70, to sublists according to states. Then, at block 72, the best paths from each of the sublists are compared to provide the survivors for the next stage. The algorithm then ends at block 74.

The basic trellis structure of FIG. 4 presents data recovery for a BPSK asynchronous CDMA system. The format of FIG. 4 is in accordance with the usual mathematical notation wherein signals at a set of input points 76 are converted to a corresponding number of signals at output points 78 by combination of the signals as indicated by the connecting paths 80. Each path 80 the provide for a negative or a positive contribution as indicated by the factors 1 and −1 positioned alongside ones of the paths.

In FIG. 5, the flow chart for the data recovery begins at block 82 and proceeds to block a 4 wherein the metric of the decision vector is set to zero. Then, at block 86, the counter of the bit vector is set to −1. The counter is then implemented at block 88 after which, at block 90, the conventional decision is appended to remaining hypotheses vectors. The procedure then advances to block 92 wherein the index is compared to a reference value. If the index is less than the reference value, the operation reverts to block 88 for incrementing the counter but, if the index is not less than the reference value, the operation proceeds to block 94.

At block 94, a new hypothesis vector is produced from each of remaining hypotheses vectors by conversion of the sign of specific bits, plus an assignment of a likelihood value to each new hypothesis vector. Thereupon, there is a sorting of the vectors at block 96 according to likelihood value, this being followed at block 98 by a checking a the value of an index, and the use of the result of the check at block 100 for outputting the sign of bit position of the hypothesis vector with the best likelihood value as the current bit decision.

The procedure then advances to block 102 wherein there is computation of the reliability. Then, at block 104, the hypothesis vectors with the lowest likelihood are discarded, as well as a discarding of the hypotheses vectors that disagree with the current bit decision. At block 106 there is a saving of a number of the remaining hypotheses vectors with the best likelihood values. Then, at block 108 there is a comparison of an index with other parameters and, if the conditions of the comparison are met, the operation reverts to block 88. If, at block 108, the conditions of the comparison are not met, then the operation advances to block 110. At block 110, there is an outputting of specific bits of the hypothesis vector with the greatest likelihood, with computation of the corresponding reliability. The procedure then terminates at block 112.

FIG. 6 shows a trellis search structure for a BPSK system wherein a succession of mathematical operations represented by paths 114 proceeds from left to right. In this example, the number of retained paths is four, and the number of path segments of the conventional decisions, indicated in dashed representation at the right of the figure is one less than the number (K) of users.

Figure 7:
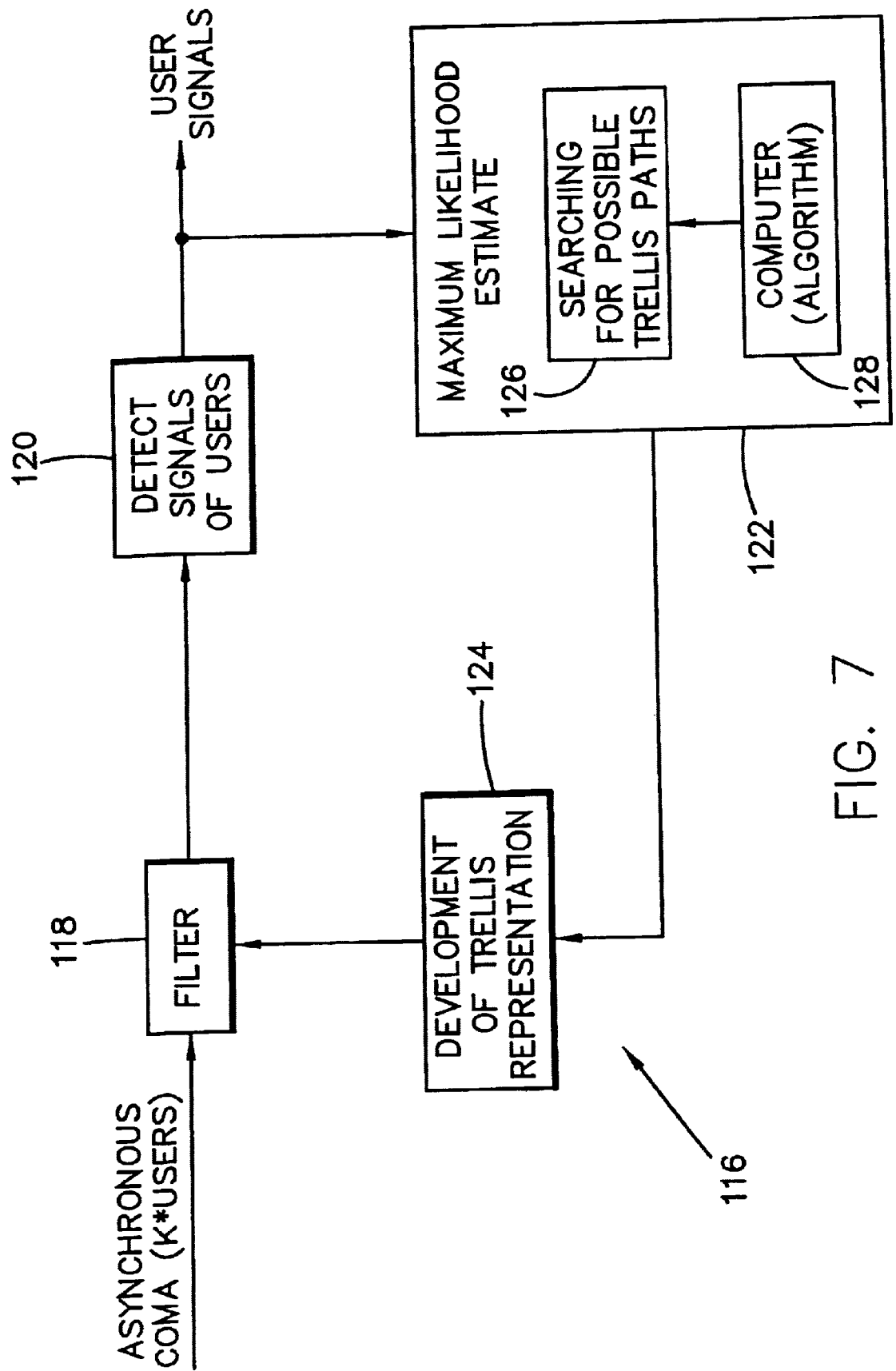
FIG. 7 is a block diagram explaining a method of multiuser detection of signals transmitted via asynchronous CDMA, in accordance with the invention.

The block diagram of FIG. 7 provides an explanation of the method of multiuser detection of signals transmitted via asynchronous CDMA by use of a filter having bit-matched inputs. A CDMA system 116 for carrying out the method has a filter 118 for receiving simultaneously the signals of K users, the signals outputted by the filter 118 being applied to a detector 120. The signals detected by the detector 120 are applied to circuitry 122 producing a maximum likelihood estimate, which estimate is employed in a developer 124 of a trellis representation. The trellis developed by the developer 124 is employed by the filter 118 for filtering the incoming user signals.

In the developer 124, the trellis representation of metrics is based on a set of bit-matched filter outputs for communication in a channel being used concurrently by the users. At the estimation circuit 122, an approximation is obtained to the maximum likelihood estimate of signals coded in a bit stream of a communication, the step of obtaining the estimate including a step of searching, indicated at block 126, by use of fractional-search algorithm, indicated at block 128, a fraction of possible paths of the trellis representation of a received sequence of data bits. The algorithm is a breadth-first sparse trellis-search algorithm.

The foregoing methodology accomplishes an object of the invention to improve performance of the RCRD detector with respect to the capacity of the detector to decide what signals have been received from a distant transmitter in the presence of multiple user interference.

Maximum Likelihood Detector

This section provides selected portions of the text of an appendix submitted as a part of the present application at the time of the filing of the application. The selected portions provide technical information useful in the practice of the invention, including material specifically referred to in the text of the specification. To facilitate a reading of the selected material concurrently with a reading of the appendix, the equation numbers, which are employed in the appendix for identifying numerous mathematical relationships, have been retained in the text of this section.

The received signal in a CDMA system is $$r(t) = \sum_n \sum_{k=1}^{K} b_k(n)\sqrt{E_k} \, e^{j\phi_k} c_k(t - \tau_k - nT_b) + \eta(t), \quad (2.1)$$

where $b_k(n) \in \{-1,1\}$ is the $n^{th}$ bit, $c_k(t)$ is the spreading waveform, $\sqrt{E_k}e^{j\phi_k}$ the complex amplitude and $\tau_k$ the delay of the $k^{th}$ user, $T_b$ is the bit time and $\eta(t)$ is a white Gaussian noise process with two-sided power spectral density $N_o/2$. Without loss of generality we assume that the users are numbered such that $0 \geq \tau_1 \geq \tau_2 \geq \ldots \tau_K$. The spreading waveform of the $k^{th}$ user is defined as $$c_k(t) = \frac{1}{\sqrt{N_c}} \sum_{m=0}^{N_c-1} c_k^{(m)} p(t - mT_c), \quad (2.2)$$

where $c_k^{(m)} \in \{-1,1\}$ is the $m^{th}$ chip of the $k^{th}$ user's spreading code, $N_c$ is the number of chips per transmitted bit or the processing gain, $T_c = T_b/N_c$ is the time per chip, and $p(t)$ is the shaping pulse assumed to be zero outside the interval $[0,T_c)$ and normalized such that $$\int_0^{T_c} p^2(t) = 1.$$

Using these definitions we observe that $$\int_0^{T_b} c_k^2(t) dt = 1. \quad (2.3)$$

This transmitter model assumes BPSK (Binary Phase Shift Keying) modulation, which is a common assumption in the analysis of multiuser receivers.

It should be understood that the bits $b_k(n)$ can be information bits, which may be assumed to be random, or can be subject to error-correction coding. The multiuser receivers described in this work assume a partitioned strategy in which the multiuser detector passes soft-decision information to a standard decoder. Convolutional codes have been assumed because of their inherent ability to process soft-decision information and their ability to process information in a sequential manner [39].

When $\tau_1 = \tau_2 = \ldots = \tau_K = 0$, the system is referred to as synchronous CDMA. When this condition is satisfied, Equation (2.1) becomes $$r(t) = \sum_n \sum_{k=1}^{K} b_k(n)\sqrt{E_k} \, c_k(t - nT_b) + \eta(t), \quad (2.4)$$

Now, since each spreading waveform is zero outside the interval $[0,T_b)$, we need only that portion of the received signal contained in the $n^{th}$ bit interval to make decisions regarding the $n^{th}$ bit of each of the K users. Without loss of generality, we consider the interval $[0,T_b)$ and we suppress the argument n.

For synchronous CDMA the set of bit matched-filter outputs $$y_k = \int_0^{T_b} r(t)\sqrt{E_l} \, c_k(t) dt \quad k = 1, \ldots, K \quad (2.5)$$

is a sufficient statistic for data estimation. We define the vectors $y=[y_1, \ldots, y_k]^T$, $b=[b_1, \ldots, b_k]^T$ and $\eta=[\eta_1, \ldots, \eta_k]^T$, where the T denotes transpose, and we note that $$y = Hb + \eta, \quad (2.6)$$

where H is the matrix of user waveform crosscorrelations whose $(k,l)^{th}$ element is $$h_{k,l} = \int_0^{T_b} \sqrt{E_k E_l} \, c_k(t) c_l(t) dt$$

and $\eta$ is a Gaussian vector with covariance matrix $$\frac{N_o}{2} H.$$

It follows the Equation (2.3) and Equation (2.9) that $h_{k,k} = E_k$.

When the user delays are not equal, the output of the $k^{th}$ bit-matched filter during bit-epoch n is given by $$y_k(n) = \int_{nT+\tau_k}^{(n+1)T+\tau_k} r(t)\sqrt{E_k} \, c_k(t - nT - \tau_k).$$

The integration time for the $n^{th}$ bit of the $k^{th}$ user overlaps with the $n^{th}$ bit of the other K−1 users, the $(n+1)^{st}$ bit of users 1 to k−1 and the $(n−1)^{st}$ bit of users k+1 to K. Thus, the definition H given in Equation (2.9) is no longer sufficient to specify the bit-matched filter output.

The H matrix is generalized by introducing a time offset to the definition as follows $$h_{j,k}(m) = \int_{-\infty}^{\infty} \sqrt{E_j E_k}\, c_j(t - \tau_j - nT_b) c_k(t - \tau_k - (m+n)T_b)\, dt$$

$$= \sqrt{E_j E_k} \int_{-\infty}^{\infty} c_j(t - \tau_j) c_k(t - \tau_k - mT_b)\, dt$$

$$= \sqrt{E_j E_k}\, \tau_{j,k}(m)$$

Because of the finite support of spreading waveform $$\tau_{j,k}(m) = \begin{cases} \int_{\max(\tau_j,\tau_k)}^{T_b+\min(\tau_j,\tau_k)} c_j(t-\tau_j)c_k(t-\tau_k)\,dt & \text{if } m=0 \\ \int_{T_b+\tau_k}^{T_b+\tau_j} c_j(t-\tau_j)c_k(t-T_b-\tau_k)\,dt & \text{if } m=1,\, \tau_j > \tau_k \\ \int_{\tau_j}^{\tau_k} c_j(t-\tau_j)c_k(t+T_b-\tau_k)\,dt & \text{if } m=-1,\, \tau_j > \tau_k \\ 0 & \text{otherwise} \end{cases}$$

Note that $h_{j,k}(m) = h_{k,j}(-m)$ and that $H(1)$ is a lower triangular matrix with zeros on the diagonal. Substituting Equation (2.1) into Equation (2.16) and applying the result of Equation (2.18) yields:

$$y_k(n) = \sum_{j=k+1}^{K} h_{j,k}(-1) b_j(n-1) + \sum_{j=1}^{k-1} h_{j,k}(1) b_j(n+1) + \sum_{j=1}^{K} h_{j,k}(0) b_j(n) + \eta_k(n),$$

where $$\eta_k(n) = \int_{nT_b+\tau_k}^{(n+1)T_b+\tau_k} \eta(t) \sqrt{E_k}\, c_k(t - nT_b - \tau_k)\, dt.$$

If we define the column vectors $$y(n) = [y_1(n) \ldots y_k(N)]^T,$$
$$b(n) = [b_1(n) \ldots b_k(N)]^T,$$
$$\eta(n) = [\eta_1(n) \ldots \eta_k(N)]^T,$$
$$\tilde{y} = [\ldots y^T(n-1) y^T(n) y^T(n+1) \ldots]^T,$$
$$\tilde{b} = [\ldots b^T(n-1) b^T(n) b^T(n+1) \ldots]^T,$$
$$\tilde{\eta} = [\ldots \eta^T(n-1) \eta^T(n) \eta^T(n+1) \ldots]^T,$$

and the tri-block diagonal matrix $$\tilde{H} = \begin{bmatrix} \ddots & \ddots & \ddots & 0 & 0 & 0 & \ldots \\ 0 & H(-1) & H(0) & H(1) & 0 & 0 & \ldots \\ \ldots & 0 & H(-1) & H(0) & H(1) & 0 & \ldots \\ \ldots & 0 & 0 & H(-1) & H(0) & H(1) & 0 \\ \ldots & 0 & 0 & 0 & \ddots & \ddots & \ddots \end{bmatrix}$$

then $$\tilde{y} = \tilde{H}\tilde{b} + \tilde{\eta},$$

which is the same form as Equation (2.8) in the synchronous case. The dimensionality of H in the synchronous case is K by K. In the asynchronous case, if matched filter outputs are observed over M bit times, $\tilde{y}$ has KM elements and the dimensionality of $\tilde{H}$ is KM by KM. Hence, the K-user M-frame asynchronous system can be viewed as a KM-user synchronous system.

The vector $\tilde{y}$ may also be represented using a single index as follows. Let $\alpha(i)$ and $\beta(i)$ be integer functions such that for any integer i $$i = \alpha(i)K + (\beta(i)-1),$$

where $1 \leq \beta(i) \leq K$. Now, if we equate $\alpha(i)$ to a bit time n and $\beta(i)$ to the user number, Equation (2.19) can be written as $$\tilde{y}_i = \sum_{j=-K+1}^{K-1} h_{j,\beta(i)}(\alpha(i) - \alpha(j)) \tilde{b}_j + \tilde{\eta}_i,$$

where $\tilde{y}_i = y_{\beta(i)}(\alpha(i))$.

A similar notation is used to model the output of the chip-matched filter when chip synchronism is assumed. We define the integer functions $v(i)$ and $k(i)$ such that for any integer i $$i = v(i) N_c + k(i),$$

where $0 \leq k(i) < N_c$. Then the output of the chip-matched filter is $$x^{(i)} = \sum_{i=1}^{K} \sqrt{\frac{E_k}{N_c}}\, b_k(\vartheta(i)) c_k^{(k(i))} + \zeta^{(i)},$$

where $\zeta^{(i)}$ is defined by Equation (2.12). Now, define $$\tilde{x} = [\ldots x^{(0)} x^{(1)} \ldots],$$
$$\tilde{\zeta} = [\ldots \zeta^{(0)} \zeta^{(1)} \ldots],$$
$$\tilde{W} = \text{diag}[\ldots WW \ldots],$$

and $$\tilde{c}_k = \frac{1}{N_c}\left[0 \ldots 0 c_k^{(0)} c_k^{(i)} \ldots c_k^{N_c}\right]^T,$$

where the number of zeros appended to the beginning of the code vector is the user delay in chips $7_k$. We also define $\tilde{C}$ as the matrix formed by placing a copy of the matrix $[\tilde{c}_1 \ldots \tilde{c}_K]$ with its top left element at each position of $\tilde{C}$ that has a row index that is a multiple of K and a column index that is a multiple of $N_c$. Any positions not defined using this process are set to zero. Using these definitions we write $$\tilde{x} = \tilde{C}\tilde{W}\tilde{b} + \tilde{\zeta}.$$

The bit-matched filter output vector can be written in terms of (2.25) as $$\tilde{y} = \tilde{W}\tilde{C}^T \tilde{x} + \tilde{W}\tilde{C}^T \tilde{\zeta}$$
$$= \tilde{W}\tilde{C}^T \tilde{C}\tilde{W}\tilde{b} + \tilde{W}\tilde{C}^T \tilde{\zeta}$$
$$= \tilde{H}\tilde{b} + \tilde{\eta}.$$

Note that $$E\{\tilde{\eta}\tilde{\eta}^T\} = \frac{N_0}{2}\tilde{H}.$$

This implies $$E\eta(n_1)\eta^T(n_2) = \begin{cases} \frac{N_0}{2}H(-1) & \text{if } n_1 - n_2 = 1 \\ \frac{N_0}{2}H(0) & \text{if } n_1 = n_2 \\ \frac{N_0}{2}H(1) & \text{if } n_1 - n_2 = -1 \\ 0 & \text{otherwise} \end{cases}$$

There follows a derivation for the ML (Maximum Likelihood) detector. The vector $\tilde{y}$ is a set of Gaussian random variables with mean vector $\tilde{H}\tilde{b}$ and covariance matrix $$\frac{N_0}{2}\tilde{H}.$$

Thus, we find that the ML estimate of the transmitted bit-stream is the bit-vector $\tilde{b}\in\{1,-1\}^{KM}$ that maximizes the likelihood function $$L(\tilde{b}) = (2\tilde{b}^T\tilde{y} - \tilde{b}^T\tilde{H}\tilde{b}),$$

where M is the total number of bit intervals in the transmission. To perform the maximization in Equation (4.1) by direct substitution would require the checking of $2^{KM}$ hypothesis vectors. For KM large this is computationally prohibitive.

First, for the asynchronous system model, consider the quadratic term on the right-hand side of Equation (4.1). Performing the matrix multiplications yields $$\tilde{b}^T\tilde{H}\tilde{b} = \sum_{i=0}^{K(M-1)} \sum_{j=0}^{K(M-1)} \tilde{b}_i \tilde{b}_j \tilde{h}_{i,j}.$$

We decompose the sum over the matrix $\tilde{H}$ on the right-hand side of Equation (4.2) into three sums. The first is a row sum over the lower triangular region where j<i, the second is a column sum over the upper triangular region where i<j, and the third is along the diagonal where i=j and we write $$\tilde{b}^T\tilde{H}\tilde{b} = \sum_{i=0}^{K(M-1)} \sum_{j=0}^{i-1} \tilde{b}_i \tilde{b}_j \tilde{h}_{i,j} + \sum_{j=0}^{K(M-1)} \sum_{i=0}^{j-1} \tilde{b}_i \tilde{b}_j \tilde{h}_{i,j} + \sum_{i=0}^{K(M-1)} \tilde{b}_i^2 \tilde{b}_j \tilde{h}_{i,j}.$$

The matrix $\tilde{H}$ is symmetric so the first two sums on the right-hand side of Equation (4.3) are equal. From the definition of $\tilde{H}$ we also observe that $\tilde{h}_{i,j}=0$ if $|i-j|>K$. Applying these results to Equation (4.3) yields $$\tilde{b}^T\tilde{H}\tilde{b} = 2\sum_{i=0}^{K(M-1)} \sum_{j=i-K+1}^{i-1} \tilde{b}_i \tilde{b}_j \tilde{h}_{i,j} + \sum_{j=0}^{K(M-1)} \tilde{b}_i^2 \tilde{h}_{i,j}.$$

We substitute Equation (4.4) into Equation (4.1) and write $$L(\tilde{b}) = 2\sum_{i=0}^{K(M-1)} \tilde{b}_i \tilde{y}_i - 2\sum_{i=0}^{K(M-1)} \sum_{j=i-K+1}^{i-1} \tilde{b}_i \tilde{b}_j \tilde{h}_{i,j} - \sum_{i=0}^{K(M-1)} \tilde{b}_i^2 \tilde{h}_{i,j}$$

We note, however, that $\tilde{b}_i^2=1$ so the last term on the right-hand side of Equation (4.5) is independent of the vector $\tilde{b}$ and can be eliminated without changing the result of the maximization. We then observe that the two remaining terms contain a common factor of two, which can also be eliminated leaving the equivalent likelihood function $$L(\tilde{b}) = \sum_{i=0}^{K(M-1)} \tilde{b}_i \tilde{y}_i - \sum_{i=0}^{K(M-1)} \sum_{j=i-K+1}^{i-1} \tilde{b}_i \tilde{b}_j \tilde{h}_{i,j}$$

The metric defined by Equation (4.6) has sufficient structure to apply an efficient method for generating the likelihood value of a given bit sequence. We define the branch metric at stage i, which is a function of the present hypothesis bit $\tilde{b}_i$ and bit-matched filter output $\tilde{y}_i$ and the state vector $$\sigma_i = [\tilde{b}_{i-k+1}, \tilde{b}_{i-K+2}, \ldots, \tilde{b}_{i-1}],$$

$$\lambda_i(\tilde{b}_i \tilde{y}_i, \sigma_i) = \tilde{b}_i \left(\tilde{y}_i - \sum_{j=i-K+1}^{i-1} \tilde{b}_j \tilde{h}_{i,j}\right)$$

The partial metric at stage i for the $m^{th}$ hypothesis bit sequence truncated at the $i^{th}$ position, which is denoted $b_{i-1}^{(m)}$ is a function of the bit-matched filter output vector up to position i which is denoted $y_{i-1}$ and is given by $$\Lambda_i(b_{i-1}^{(m)}, y_{i-1}) = \Lambda_{i-1}((b_{i-2}^{(m)}, y_{i-2})) + \lambda_{i-1}(\tilde{b}_{i-1}^{(m)}, \tilde{y}_{i-1}, \sigma_{i-1}^{(m)}),$$

where, by definition, $\Lambda_i = \tilde{b}_0 \tilde{y}_0$. It is clear that for a given hypothesis vector $\tilde{b}^{(m)}$ that $L(\tilde{b}^{(m)}) = \Lambda(b^{(m)}, y_{K(M-1)})$.

Using the definitions for the state and for the branch and path metrics given in Equations (4.7)–(4.9) we can set up a trellis for doing an efficient comparison of all possible hypothesis vectors using the Viterbi algorithm. To help visualize the concept, we show an example of a trellis stage for a 3-user BPSK system in FIG. 4, where $$\Lambda_i^{(s)} = \max(\Lambda_{i-1}^{(\alpha)} + \lambda_{i-1}(b_{i-1}^{(s)}, \tilde{y}_{i-1}, \sigma_{i-1}^{(\alpha)}),$$

$$\Lambda_{i-1}^{(\beta)} + (b_{i-1}^{(s)}, \tilde{y}_{i-1}, \sigma_{i-1}^{(\beta)})),$$

where the states $\sigma_{i-1}^{(\alpha)}$ and $\sigma_{i-1}^{(\beta)}$ are the two states that transition to state $\sigma_i^{(s)}$ and $b_{i-1}^{(s)} \in \{+1,-1\}$ is the bit that causes the transition.

In general, the number of states in the trellis for a given system is $A^{K-1}$, where A is a cardinality of the source alphabet and K is the number of active users. It is assumed hereafter that A=2.

The flow of the ML detector proceeds as follows:
1. Define $\tilde{b}_i=0$ for i<0 or i>K(M-1).
2. Set i=0
3. i=i+1
4. For each state $\sigma_i^{(s)}$ compute the new path metric $\Lambda_i^{(s)}$ using Equation (4.10).
5. If i≥e, find e the maximum metric max, $\Lambda_i^{(s)}$ and output the bit at stage i−e that corresponds to that state, where e is the decoding delay. (The determination of this bit can be done using state traceback or register exchange [79].)
6. If i<K(M−1), go to Step 3.
7. Find the maximum metric max, $\Lambda_{K(M-1)}^{(s)}$ and output the bits at stages (K(M−1)−e+1) to K(M−1) corresponding to that state.

Note that if $e=K(M-1)$ the ML hypothesis is found. In practice, if $K(M-1)$ is large the path depth e can be chosen to provide near ML performance with a reasonable amount of detector delay. The elimination of paths that merge in state in Step 4 of the algorithm is justified by the additive nature of the branch metrics. From the point of state merger, the two paths traverse the same set of states and gain the same metric increments. Therefore, the losing path can never be the ML path and is eliminated from further consideration.

The complexity of a full trellis search is prohibitive for more than a small number of users. Techniques for doing a sparse trellis search based on the structure of the ML detector are now presented.

The Viterbi algorithm (VA) is used to decode trellis codes, remove intersymbol interference (ISI), and other similar applications. In these applications, the exponential complexity of the VA in the number of states has led to the development of search algorithms that examine only a fraction of the possible paths to estimate the received sequence. The application of breadth-first sparse trellis-search algorithms for multiuser detection is explored further.

There are many possibilities for breadth-first search algorithms for asynchronous CDMA multiuser detectors. One method for grouping these algorithms is using the SA(B,C) description. An algorithm is a member of the SA(B,C) family if it fits into the following structure:
1. The $2^{K-1}$ states are partitioned into C sublists, where the state is defined by Equation (4.7).
2. The BC surviving paths from the previous stage are extended to 2BC paths using Equations (4.8) and (4.9).
3. The 2BC paths are assigned to the C sublists according to state.
4. The best B paths from each of the C sublists are the survivors for the next stage.

Another family of breadth-first algorithms is specified using a SAN(B) search algorithm. An algorithm is a member of the SAN(B) family if it fits into the following structure:
1. The $2^{K-1}$ states are partitioned into $2^N$ sublists, where the sublist is defined by the last $N_s$ bits of the state vector and $1 \leq N_s < K$. In other words, the bits $\hat{b}_{i-N}, \ldots, \hat{b}_{i-1}$ in Equation (4.7) are the same for all members of the sublist.
2. The B surviving paths from the previous stage are extended to 2B paths.
3. The 2B paths are assigned to the $N_s$ sublists according to state.
4. The best paths from each of the $N_s$ sublists are compared and the best B are the survivors for the next stage.

The SA(B,C) and the SAN(B) families are not equivalent sets. An algorithm that is a member of the SA(B,C) that keeps C>1 survivors from each sublist cannot be a member of the SAN(B) family. It is also true that an algorithm contained in the SAN(B) family that prunes the sublist survivors cannot be a member of the SA(B,C) family.

We have developed the following method for specifying a family of breadth-first trellis-search algorithms, which contains the algorithms specified by the SA(B,C) and SAN(B) as proper subsets. We denote this family SA(X,Y,Z) and define its members to have the following structure:
1. The $2^{K-1}$ states are partitioned into Y sublists.
2. The X surviving paths from the previous stage are extended to 2X paths.
3. The 2X paths are assigned to the Y sublists according to state.
4. The best Z paths from each of the Y sublists are compared and the best X are the survivors for the next stage.

Important subsets of the SA(X,Y,Z) set of algorithms include $$SAN(B) \Rightarrow X = B, Y = 2^{N_s}, Z = 1$$

$$SA(B, C) \Rightarrow X = BC, Y = C, Z = B$$

$$Viterb \Rightarrow X = 2^{K-1}, Y = 2^{K-1}, Z = 1$$

$$M \Rightarrow X = M, Y = 1, Z = M.$$

The need for the flexibility of the SA(X,Y,Z) family to specify breadth-first detector algorithms is illustrated by an example. A set of 20 spreading sequences was generated based on a set of Gold codes of length 31. One spreading sequence was defined to have zero delay and the others were assigned delays of between 1 and 30 chips. The subset of 10 spreading sequences in Table 4.1 was then used to model a 10-user asynchronous system and the standard M-algorithm and a pruned M-algorithm were used as detectors. The standard M-algorithm is defined in SA(B,C) notation as SA(M,1). The pruned M-algorithm differs from the M-algorithm in that it prunes the worst of any two paths that have merged in state in the complete trellis. This procedure cannot be defined using SA(B,C) notation, but is defined as an SA(M,$2^{K-1}$,1) detector in SA(X,Y,Z) notation (this is also a SAN(B) algorithm with B=1 and N=K−1). The PBE of the standard M-algorithm exhibits nonmonotonic behavior in M and does not achieve ML performance even for M as high as 16. The pruned M-algorithm asymptotically approaches ML performance and is within 0.1 dB with M=6. The ML detector for a 10-user system requires 512 states, hence the complexity of the pruned M-algorithm is small in comparison.

It was observed, also via simulation, that the nonmonotonic behavior of the standard M-algorithm occurs because merged paths survive. This makes the effective number of paths smaller because a merged path with a lower metric has no further information about the ML path. It was also observed that when the number of users was increased to 20, which requires a $2^{19}$=524288 state trellis for a BPSK.

TABLE 4.1

User Sequences and Delays for a 10 User CDMA System

| Sequence Number | Spreading Sequence | | | | | | | | | | | Delay |
|---|---|---|---|---|---|---|---|---|---|---|---|---|
| 1 | −1 | 1 | −1 | −1 | −1 | 1 | −1 | −1 | −1 | 1 | −1 | 0 |
| | −1 | 1 | −1 | −1 | 1 | 1 | 1 | −1 | −1 | −1 | −1 | |
| | 1 | −1 | −1 | 1 | 1 | −1 | 1 | 1 | −1 | | | |
| 4 | −1 | 1 | −1 | −1 | 1 | −1 | −1 | −1 | 1 | 1 | −1 | 6 |
| | 1 | −1 | 1 | 1 | −1 | 1 | −1 | 1 | 1 | −1 | −1 | |

TABLE 4.1-continued

User Sequences and Delays for a 10 User CDMA System

| Sequence Number | Spreading Sequence | | | | | | | | | | | Delay |
|---|---|---|---|---|---|---|---|---|---|---|---|---|
| | 1 | 1 | -1 | -1 | 1 | 1 | -1 | 1 | 1 | | | |
| 6 | 1 | 1 | -1 | 1 | -1 | 1 | 1 | 1 | 1 | -1 | 1 | 9 |
| | -1 | -1 | 1 | 1 | 1 | 1 | 1 | 1 | -1 | 1 | -1 | |
| | -1 | 1 | -1 | -1 | 1 | -1 | 1 | 1 | 1 | | | |
| 7 | -1 | 1 | -1 | 1 | 1 | 1 | -1 | 1 | -1 | 1 | 1 | 14 |
| | 1 | -1 | 1 | 1 | 1 | -1 | 1 | -1 | 1 | -1 | -1 | |
| | -1 | -1 | 1 | 1 | -1 | 1 | 1 | -1 | -1 | | | |
| 8 | -1 | 1 | -1 | 1 | -1 | -1 | -1 | 1 | 1 | 1 | 1 | 16 |
| | -1 | 1 | -1 | -1 | -1 | -1 | 1 | -1 | 1 | -1 | -1 | |
| | -1 | 1 | 1 | -1 | -1 | -1 | -1 | 1 | 1 | | | |
| 16 | 1 | 1 | -1 | 1 | -1 | 1 | 1 | 1 | -1 | -1 | 1 | 26 |
| | 1 | 1 | -1 | -1 | 1 | 1 | -1 | -1 | 1 | 1 | -1 | |
| | -1 | -1 | -1 | 1 | 1 | 1 | -1 | 1 | -1 | | | |
| 17 | 1 | -1 | 1 | -1 | 1 | -1 | 1 | -1 | -1 | 1 | 1 | 27 |
| | -1 | -1 | 1 | -1 | -1 | 1 | 1 | 1 | 1 | -1 | -1 | |
| | -1 | 1 | -1 | 1 | -1 | -1 | 1 | -1 | 1 | | | |
| 18 | 1 | -1 | -1 | -1 | 1 | 1 | -1 | 1 | 1 | -1 | 1 | 28 |
| | 1 | 1 | 1 | 1 | -1 | 1 | 1 | -1 | 1 | -1 | 1 | |
| | 1 | 1 | 1 | 1 | -1 | -1 | 1 | 1 | -1 | | | |
| 19 | 1 | -1 | -1 | -1 | -1 | -1 | -1 | 1 | -1 | -1 | 1 | 29 |
| | -1 | -1 | -1 | -1 | 1 | 1 | -1 | -1 | -1 | -1 | 1 | |
| | 1 | -1 | 1 | -1 | 1 | -1 | 1 | 1 | 1 | | | |
| 20 | 1 | -1 | -1 | 1 | -1 | 1 | -1 | 1 | 1 | -1 | -1 | 29 |
| | -1 | -1 | -1 | -1 | -1 | -1 | 1 | 1 | -1 | 1 | | |
| | -1 | 1 | -1 | 1 | 1 | 1 | 1 | -1 | -1 | | | |

ML detector, that the probability of retaining two merged paths became negligible and pruning had little effect on the PBE.

To generate the RCRD for asynchronous CDMA, we begin by dividing the right-hand side of Equation (4.1) by four and define the equivalent likelihood function $$L(\tilde{b}) = \left(\frac{1}{2}\tilde{b}^T\tilde{y} - \frac{1}{4}\tilde{b}^T\tilde{H}\tilde{b}\right),$$

Now, we consider two KM dimensional bit vectors $\tilde{b}$ and $\tilde{d}$ that differ only in bit position j. Applying the definition of the likelihood function given in Equation (4.11) and simplifying yields $$L(\tilde{d}) = L(\tilde{b}) + \frac{1}{2}\tilde{y}_j(\tilde{d}_j - \tilde{d}_b) + \frac{1}{4}(\tilde{b}^T\tilde{H}\tilde{b} - \tilde{d}^T\tilde{H}\tilde{d})$$

It follows that $$\frac{1}{4}(\tilde{b}^T\tilde{H}\tilde{b} - \tilde{d}^T\tilde{H}\tilde{d}) = [0, \ldots, 0, \tilde{b}_j, 0, \ldots, 0]\tilde{H}[\tilde{b}_0, \ldots, \tilde{b}_{j-1}, 0,$$

$$\tilde{b}_{j+1}, \ldots \tilde{b}_{K(M-1)}]^T$$

$$= \tilde{b}_j \sum_{i=0, i\ne j}^{K(M-1)} \tilde{b}_i \tilde{h}_{j,i}$$

$$= \tilde{b}_j \sum_{i=j-K+1, i\ne j}^{j+K-1} \tilde{b}_i \tilde{h}_{j,i}.$$

where the last equality is due to the fact that $\tilde{h}_{j,i}=0$ for $|i-j|>K$. Substituting Equation (4.13) into equation (4.12) yields $$L(\tilde{d}) = L(\tilde{b}) - \tilde{b}_j\tilde{y}_j + \tilde{b}_j\left(\sum_{i=j-K+1, i\ne j}^{j+K-1} \tilde{b}_i\tilde{h}_{j,i}\right)$$

We see that it is possible to compute $L(\tilde{d})$ from $L(\tilde{b})$ using 2K additions. It is informative to look at the following equivalent way of writing Equation (4.14) based on Equation (2.21):

$$L(\tilde{d}) =$$

$$L(\tilde{b}) - b_{\beta(j)}(\alpha(j))y_{\beta(i)}(\alpha(j)) + b_{\beta(j)}(\alpha(j))\left(\sum_{i=\beta(j)+1}^{K} h_{\beta(j),i}(-1)b_i(\alpha(j)-1) + \right.$$

$$\left.\sum_{i=1, i\ne\beta(j)}^{K} h_{\beta(j),i}(0)b_i(\alpha(j)) + \sum_{i=1}^{\beta(j)-1} h_{\beta(j),i}(1)b_i(\alpha(j)+1)\right)$$

This representation of generating one likelihood value from another shows the specific dependence on past, present and future bit intervals.

We are now ready to define a recursive breadth-first trellis search based on Equation (4.14). To begin the recursion we generate a starting vector $\tilde{u}^{(1)}$ by applying the conventional detector to the asynchronous bit-matched filter outputs $\tilde{y}$. We then define $\tilde{b}_i=0$ for $i<0$ and begin the recursion after the first K matched filter outputs have been received. We invert the first bit of $\tilde{u}^{(1)}$ to produce $\tilde{u}^{(2)}$ and compute its metric relative to $\tilde{u}^{(1)}$ using Equation (4.14). We move to the next stage by adding the next conventional decision to vectors $\tilde{u}^{(1)}$ and $\tilde{u}^{(2)}$ and then inverting the second bit of $\tilde{u}^{(1)}$ and $\tilde{u}^{(2)}$ to generate $\tilde{u}^{(3)}$ and $\tilde{u}^{(4)}$, respectively. We compute likelihood values for $\tilde{u}^{(3)}$ and $\tilde{u}^{(4)}$ using Equation (4.14). Theoretically, this procedure can be continued until likelihood values have been computed for all $2^{K(M-1)}$ hypothesis bit vectors and then the ML estimate is the bit vector with the largest likelihood value. This is impractical, but the recursion does lend itself to a reduced-complexity trellis search algorithm. The method chosen for the asynchronous CDMA channel is an SA(M,$2^{(K-1)}$,1) algorithm because of its fixed resource requirements and performance. It is also clear that for K(M−1) large the entire path cannot be saved before a decision is made. Therefore, we define the maximum decision delay, or path memory, to be e and we make a decision delay, or path memory, to be e and we make a decision on bit $\tilde{b}_{j-e}$ after the bit-inversions and likelihood value comparisons at bit position j.

We now summarize the RCRD algorithm for uncoded asynchronous CDMA:
1. Set L($\tilde{u}^{(1)}$)=0 and i=−1
2. i=i+1
3. Append the conventional decision ($\tilde{y}_i$) to all remaining hypothesis vectors at position i
4. If i<(K−1), go to step 2
5. Produce a new hypothesis vector from each of the current hypothesis vectors by inverting the sign of the (i−K+1)$^{st}$ bit. Assign a likelihood value to each new hypothesis vector using Equation (4.14).
6. Sort the hypothesis vectors according to likelihood value.
7. If (i−K+1)>e, output bit (i−K+1−e) of the hypothesis vector with the largest metric as the decision for bit $\tilde{b}_{i+1-K-e}$.
8. Test for state merges and eliminate the hypothesis vector with the lowest metric if a merger occurs, where the state is defined by bits (i−2K+2) to (i−K).
9. Discard all hypothesis vectors that disagree with the current bit decision at position (i+1−K−e)
10. Save up to M of the remaining hypothesis vectors with the best metrics.
11. If i<K(M−1), go to step 2.
12. Output bits K(M−2)−e to K(M−1) of the hypothesis vector with the greatest likelihood as the bit estimates for bits $\tilde{b}_{K(M-2)-e}$ to $\tilde{b}_{K(M-1)}$.

A sample trellis for the RCRD algorithm is shown in FIG. 6 for M=4 and K=5. Each of the four surviving paths is extended K−1 stages into the future using conventional decisions. These extensions are represented by dotted lines in FIG. 6. Suppose the current matched filter input is $\tilde{y}_i$, then the number of surviving paths is doubled by inverting the (i−K+1)$^{st}$ bit of each survivor and assigning a metric to these paths using Equation (4.14). The 8 paths produced are sorted, checked for state merger, and then the best 4 paths are carried to the next stage. A bit decision is then made for the bit that caused the state transition e stages back from the bit-fiddle point, or equivalent for bit $\tilde{b}_{i-K+1-e}$. This bit can be determined using either traceback or register exchange as is done in the ML detector [79]. For this example, all paths have the same bit estimate at the decoding depth, which is common if the decoding depth is chosen appropriately. The decoding depth in this example was e=10. The trellis structure for the pruned M algorithm is formed from that shown in FIG. 6 by eliminating the conventional decision extensions.

It might be advantages to explore a trade-off of depth vs breadth in the trellis search. With this in mind we developed an algorithm to allow this trade-off, which we refer to as the mature M algorithm. This algorithm allows the nodes being compared for survival to adopt the best metric from its descendants $N_j$ stages into the future. The algorithm works as follows for a BPSK system.
1. Grow the trellis to $2^{N_j+M}$ branches from $2^{N_j+M-1}$ surviving descendants from the previous stage, where M is the number of parent nodes retained, or the breadth parameter, and $N_j$ is the number of stages of maturity, or the depth parameter.
2. Assign each of the 2M parent nodes the best metric of its $2^{N_j}$ descendants, where the metrics of the descendants are computed using Equations (4.8) and (4.9).
3. Output the bit corrsponding to the path traversed by the best parent node e stages in the past.
4. If any parent nodes have merged in state eliminate the one with the worst metric.
5. The $2^{N_j+M-1}$ descendants of the M parent nodes with the best metric are the survivors for the next stage.

The complexity of the mature M algorithm is equivalent to that of the pruned M algorithm with $M_{eff}=2^{M+N_j-1}$ paths retained. For example, a mature M algorithm with M=2 and $N_j$=2, would have the complexity of a pruned M algorithm with M=8.

There follows a description of the modifications required to the asynchronous version of the RCRD detector to produce reliability values for each user that are appropriate for soft-decision decoding of the ECC of that user.

Fortunately, there is a low-complexity method that proved effective in providing reliability information. This method is based on Equation (4.14), which specifies a way to compute the difference in the likelihood values between any two vectors $\tilde{b}$ and $\tilde{d}$ that differ only at bit position j as $$\Delta_j = L(\tilde{b}) - L(\tilde{d}) = \tilde{b}_j \tilde{y}_j - \tilde{b}_j \left( \sum_{i=j-K+1, i \neq j}^{j+K-1} \tilde{b}_i \tilde{h}_{j,i} \right)$$

This metric difference $\Delta_j$ is a good reliability measure for bit-position j, given that j is the position of the current bit estimate. If the RCRD detector is used, this reliability computation requires the additional storage of the past K−1 bit decisions and K+e bit-matched filter outputs and 2(K−1) more additions. In [31], Hoeher applied a similar technique to determine reliability information for a synchronous CDMA system.

The modifications required to add reliability information to the RCRD algorithm are presented as steps added to the algorithm. First we add step 7a between steps 7 and 8.
7a. Let m=i+1−K−e and compute the reliability value of bit $\tilde{b}_m$ using Equation (4.22) as Next we add step 13 after step 12 to handle edge conditions.
13. Compute the reliability value of the remaining bits using Equation (4.23) and truncating the sum at the burst boundary by zeroing nonexistent values.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:
1. A method of multiuser detection of signals transmitted via asynchronous CDMA by use of a filter having bit-matched outputs, comprising the steps of:
   developing a trellis representation of metrics based on a set of bit-matched filter outputs for communication in a channel being used concurrently by K users;
   obtaining an approximation to the maximum likelihood estimate of signals coded in a bit stream of a communication, said step of obtaining the estimate comprising a step of searching, by use of fractional-search algorithm, a fraction of possible paths of the trellis representation of a received sequence of data bits;

wherein the algorithm is a breadth-first sparse trellis-search algorithm having a structure characterized by:
there are $2^{K-1}$ states partitioned into Y sublists;
the X surviving trellis paths from the previous stage of a succession of trellis computations are extended to 2X paths;
the 2X paths are assigned to the Y sublists according to state; and
the best paths from each of the Y sublists are compared, and the best X paths are the survivors for a succeeding stage of the trellis search.

2. A method of multiuser detection of signals transmitted via asynchronous CDMA by use of a filter having bit-matched outputs, comprising the steps of:
developing a trellis representation of metrics based on a set of bit-matched filter outputs for communication in a channel being used concurrently by K users;
obtaining an approximation to the maximum likelihood estimate of signals coded in a bit stream of a communication, said step of obtaining the estimate comprising a step of searching, by use of search algorithm, possible paths of the trellis representation of a received sequence of data bits;
wherein the algorithm is a recursive breadth-first trellis-search algorithm comprising steps of:
generating a starting vector representing the signs of the elements of said set of bit-matched filter outputs;
introducing a recursion process after receipt of the first K signals of the respective matched filter outputs, the recursion process including a producing of a new set of hypothesis vectors by appending the sign of the current matched filter outputs to each of the hypothesis vectors retained from the last recursion and inversion of bit j of each of these vectors, wherein j is the number of matched filter outputs received after the first K signals, said recursion process including an assigning a likelihood value to each vector, and a sorting the vectors according to likelihood value; and
continuing the recursion process by inversion of subsequent bits of each of the pair of vectors to provide a modified pair of the vectors, and making a conventional decision upon the modified pair of vectors followed by a summing of the conventional decision to each of resulting vectors.

3. A method according to claim 2 wherein individual bits b are identified by a number i, respective stages of said recursion process contain respective values of hypothesis vectors, and said recursion process further comprises steps of:
outputting bit (i−K+1−decision delay) of the hypothesis vector with the largest metric as the decision, if (i−K+1)>decision delay; and
eliminating vectors according to the sponsor trellis-search algorithm.

4. A method according to claim 3 wherein, to obtain reliability information, there is introduction of a parameter m=(i+1−K−decision delay), and the method comprises a further step of computing the reliability information for bit $b_m$ from the following equation:

$$\tilde{b}_m \tilde{y}_m - \tilde{b}_m \left( \sum_{j=m-K+1, j \neq m}^{m+K-1} \tilde{b}_j \tilde{h}_{j,m} \right).$$

wherein $\tilde{y}$ is a set of Gaussian random variables related to $\tilde{b}$ by $\tilde{y} = \tilde{H}\tilde{b}$, and $\tilde{h}$ is a term of a matrix $\tilde{H}$, $\tilde{H}$ being the matrix of user waveform cross-correlations.

5. A method of multiuser detection of signals transmitted via asynchronous CDMA by use of a filter having bit-matched outputs, comprising the steps of:
developing a trellis representation of metrics based on a set of bit-matched filter outputs for communication in a channel being used concurrently by K users;
obtaining a maximum likelihood estimate of signals coded in a bit stream of a communication, said step of obtaining the estimate comprising a step of searching, by use of a search algorithm, possible paths of the trellis representation of a received sequence of data bits;
wherein the algorithm is operative with a succession of stages of trellis processing and, for a binary phase shift keying communication channel, is characterized by steps of:
growing the trellis to $2^{N+M}$ branches from $2^{N+M-1}$ surviving descendants from a previous stage, where M is the number of parent nodes retained and serves as a breadth parameter, and N is the number of stages of maturity and serves as a depth parameter;
assigning to each of the 2M parent nodes the best metric of its $2^N$ descendants;
outputting the bit corresponding to the path traversed by the best parent node a designated number of stages in the past;
observing if any parent nodes have merged in state, and eliminating the one of the parent nodes with the worst metric; and
employing the $2^{N+M-1}$ descendants of the M parent nodes with the best metric as the survivors for a next stage of trellis computation.

* * * * *